UNITED STATES PATENT OFFICE.

JASON CRANE, OF BLOOMFIELD, NEW JERSEY.

IMPROVEMENT IN METHODS OF MOLDING PLASTIC MATERIALS.

Specification forming part of Letters Patent No. 220,348, dated October 7, 1879; application filed September 15, 1879.

*To all whom it may concern:*

Be it known that I, JASON CRANE, of Bloomfield, in the county of Essex and State of New Jersey, have invented certain new and useful Improvements in Methods of Molding Plastic Materials; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to produce ornamental designs on such articles as are molded from plastic compositions, such as cameos, buttons, studs, breast-pins, billiard-balls, buckles, and, in fact, all such articles as are formed from plastic compositions in molds or dies.

It is frequently desirable in such articles to have the plastic compositions which form the articles of different colors. Heretofore the different colored compositions have been placed in the mold at the same time, or the articles have been colored in designs after they have been formed.

By the first method it is impossible to form fine, sharp, and clearly-defined outlines between the different colors, and by the latter there is only a surface-coloring to the article.

Now, this invention consists in first pressing or forming, in a suitable mold or die, a figure of the design or ornamental portion, and then, when cold or solidified, removing this portion (or portions, if several designs are to be incorporated in one piece) from the mold, and then placing this piece or pieces in a mold or die of the form to make the entire piece. The remainder of the mold is then filled with stock, such as is to form the body of the article, and the whole then pressed together.

This operation completely incorporates the figures or designs in the ground or body, with clear, sharp, and well-defined outlines. There is no blending or mixing of the different colors where they come together, as is always the case where pastes of different colors are molded all at once together in the same mold.

By this process cameos in alto or bass relief in different colors may be formed, so that the figure or ornamental portion will be perfectly set in the base-frame or ground portion and have no blending of the colors.

Buttons, pins, charms, ornamental boxes, checker-pieces, chess-men, and a great variety of other articles may be formed in the same manner.

In forming billiard-balls of plastic materials—such as artificial ivory, of whatever composition—it is sometimes desirable to have a white spot to receive the number. In this case a white plug is first molded. This is then placed in the ball-mold and filled around with stock of the color to form the ball. This plug may be undercut, if necessary, or enlarged inwardly, so as make it impossible to separate the parts when molded together.

The molds or dies may be of any of the known forms or kinds used for forming articles of plastic materials which are naturally soft enough to be formed by molding, or which may be softened by heat.

The kind of molds and the modes of heating the same, and the kinds of compositions which are used to form molded articles, being well known, need not be denoted.

I am aware that designs in metal and other solid, but not plastic, materials have been placed in molds, and plastic materials molded therein, so as to inlay the same, and this I do not claim.

Having thus described my invention, what I claim, and desire to secure by Letters Patent, is—

1. The method herein described for forming molded articles from plastic materials, consisting in first molding the figures or designs in molds or dies, and then placing the part or parts thus formed in a finishing-mold with the proper amount of stock and uniting the whole into one piece, substantially as set forth.

2. As a new manufacture, articles molded of plastic materials, having the designs or figures molded in separate dies and united with the body of the articles, so as to present a sharp outline between the figure and the ground, substantially as set forth.

In testimony that I claim the foregoing I have hereunto set my hand this 11th day of September, 1879.

JASON CRANE.

Witnesses:
 HALSEY M. BARRETT,
 FREDK. CRANE.